(12) United States Patent
Espinoza

(10) Patent No.: US 7,219,685 B1
(45) Date of Patent: May 22, 2007

(54) GATE VALVE LOCKING DEVICE

(76) Inventor: Roger Espinoza, 32 E. Country Club Dr., Brentwood, CA (US) 94513

( * ) Notice: Subject to any disclaimer, the term of this patent is extended or adjusted under 35 U.S.C. 154(b) by 141 days.

(21) Appl. No.: 11/155,700

(22) Filed: Jun. 17, 2005

Related U.S. Application Data

(60) Provisional application No. 60/581,804, filed on Jun. 22, 2004.

(51) Int. Cl.
*F16K 35/00* (2006.01)

(52) U.S. Cl. .......................... 137/385; 70/177; 70/180; 70/212; 70/226

(58) Field of Classification Search ................ 137/383, 137/385; 70/175, 176, 177, 178, 179, 180, 70/209, 210, 211, 212, 225, 226
See application file for complete search history.

(56) References Cited

U.S. PATENT DOCUMENTS

| | | | |
|---|---|---|---|
| 1,924,831 A | | 8/1933 | Bockman |
| 1,986,128 A | * | 1/1935 | Trott ............................ 70/212 |
| 2,161,626 A | | 6/1939 | Loughner et al. |
| 2,324,633 A | * | 7/1943 | McCarthy et al. ............ 70/180 |
| 2,390,972 A | | 12/1945 | Weinberg |
| 3,006,181 A | * | 10/1961 | Sarti ............................ 70/180 |
| 4,397,332 A | | 8/1983 | Sample |
| 5,238,141 A | * | 8/1993 | Callegari et al. ........... 220/725 |
| 5,353,833 A | | 10/1994 | Martinez |
| 5,439,130 A | | 8/1995 | Waugh |
| 5,596,892 A | | 1/1997 | Edgar et al. |
| 5,620,022 A | | 4/1997 | Manoogian |
| 6,044,860 A | | 4/2000 | Neu |
| 6,164,318 A | | 12/2000 | Dixon |
| 6,257,273 B1 | | 7/2001 | Neu |
| 6,354,116 B1 | | 3/2002 | Drake |
| 6,460,383 B1 | * | 10/2002 | Wadsworth, Jr. ............. 70/177 |
| 6,606,888 B2 | | 8/2003 | Steinle et al. |
| 6,786,230 B2 | | 9/2004 | Lacroix |
| 6,871,518 B2 | | 3/2005 | Olsen et al. |

FOREIGN PATENT DOCUMENTS

DE 912517 7/1949

* cited by examiner

*Primary Examiner*—Eric Keasel
*Assistant Examiner*—John K. Fristoe, Jr.
(74) *Attorney, Agent, or Firm*—Wood, Herron & Evans, LLP

(57) ABSTRACT

A locking device for gate valves utilizes an available lock and avoids the necessity of having to chain or weld the lock to the bonnet or other stationary portion of a standard gate valve. The locking device includes a bracket, which mounts securely to one of the truss members of the gate valve. The bracket also includes an upwardly projecting mast, which is inserted between the adjacent spokes of the hand wheel. A cap is seated onto the hand wheel and the mast of the bracket installed on the gate valve. The cap includes a mast port though which the upper end of the mast projects when the cap is seated on the hand wheel. In certain embodiments, the cap covers all of the spokes on the hand wheel and has a number of downwardly projecting spaced spoke detents that are inserted into the openings between the adjacent spokes of the hand wheel. The secure and easy installation of the cap onto the mast of the bracket and the hand wheel prevents rotation of the hand wheel and adjustment of the valve.

37 Claims, 7 Drawing Sheets

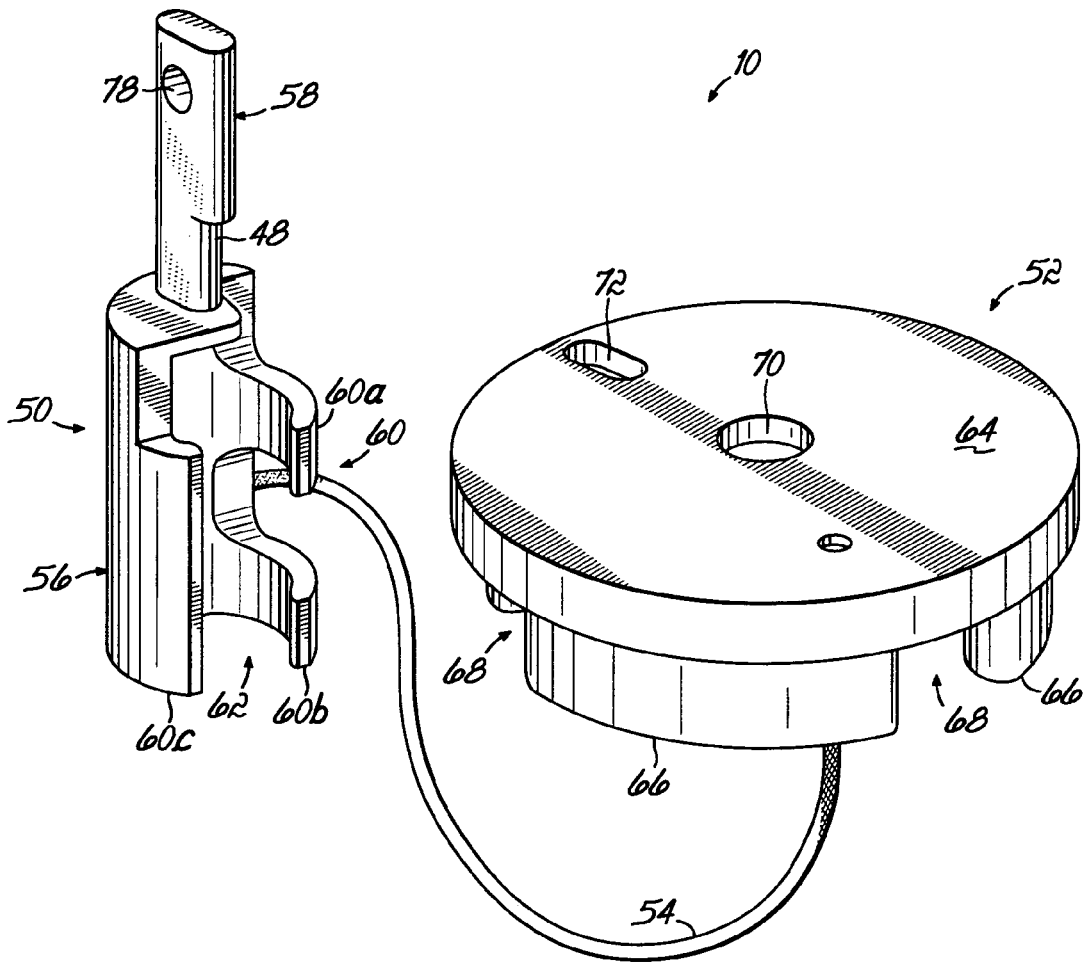
FIG. 1
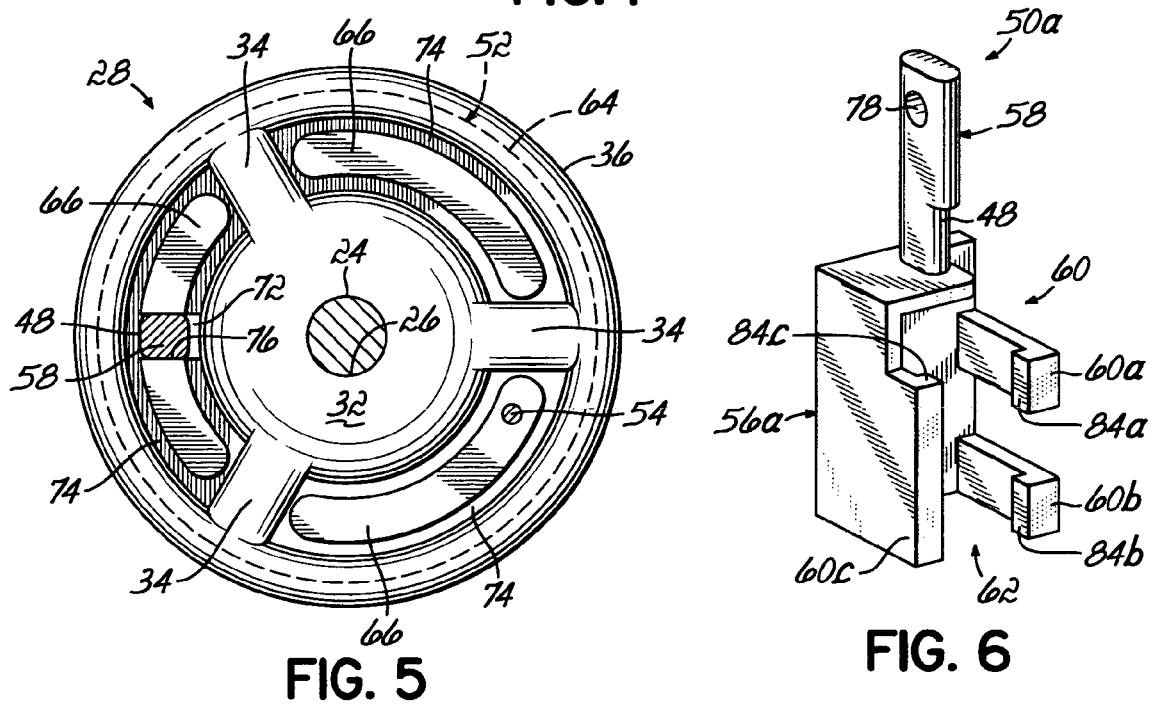
FIG. 5
FIG. 6

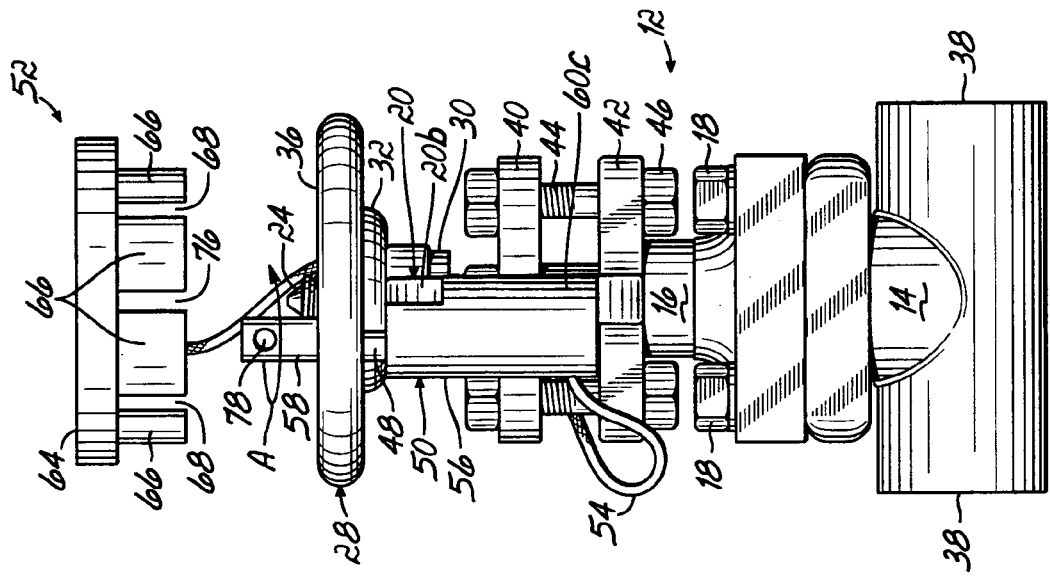
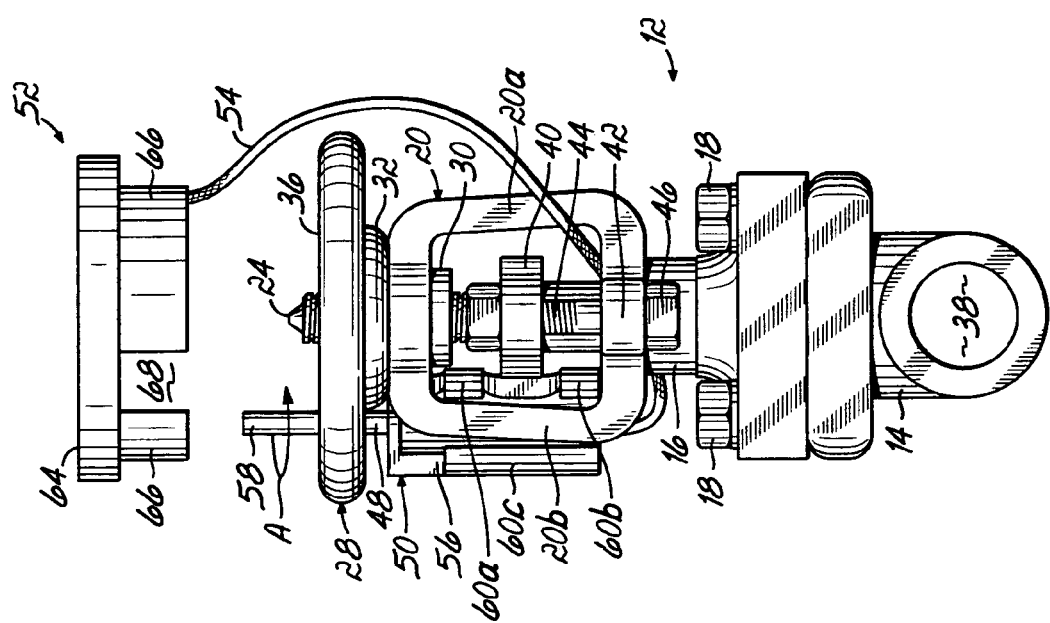

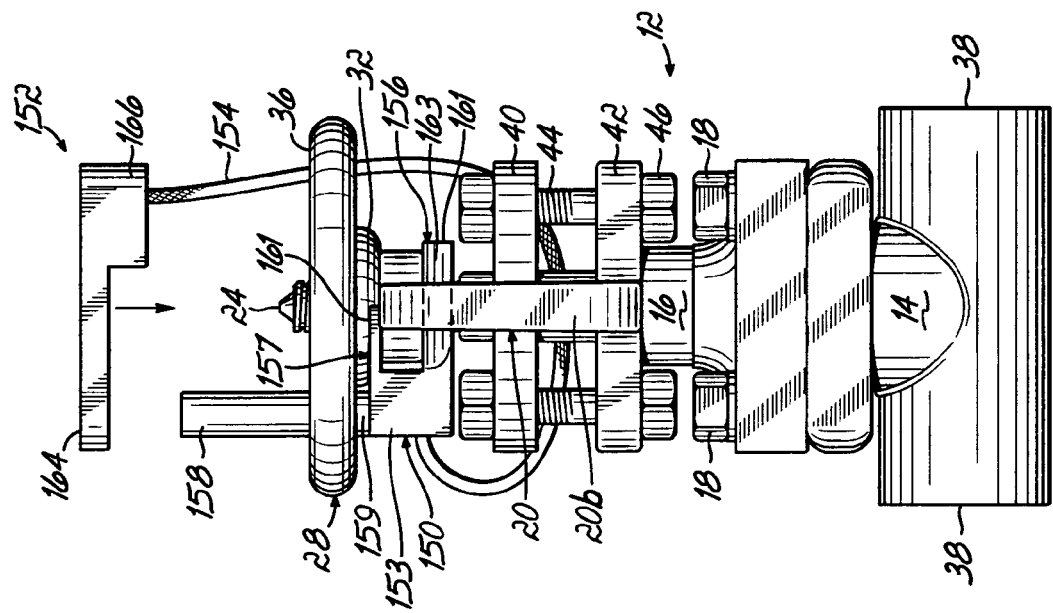
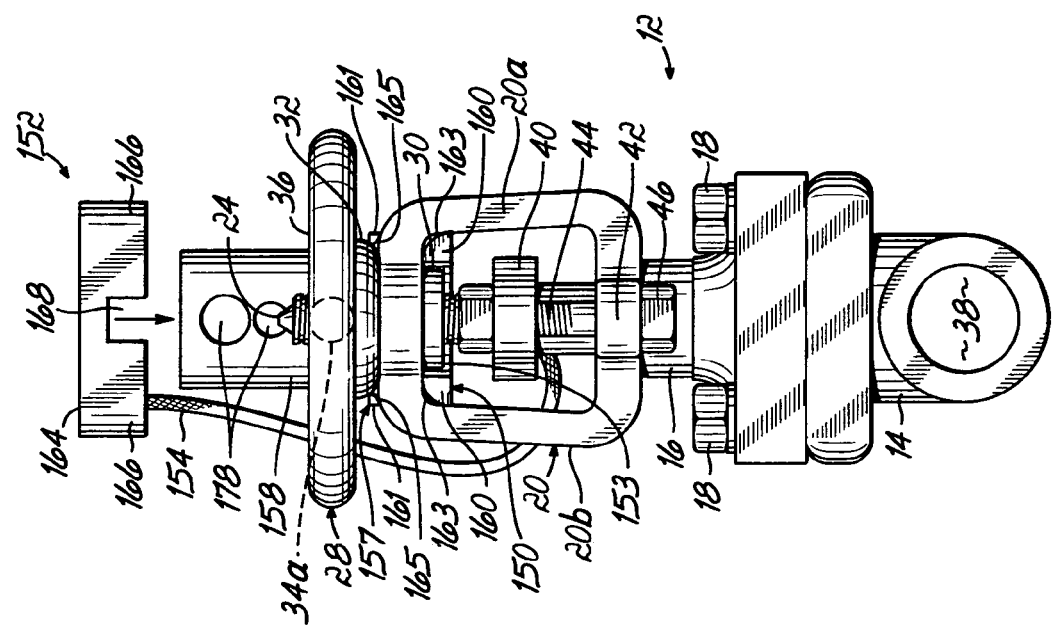

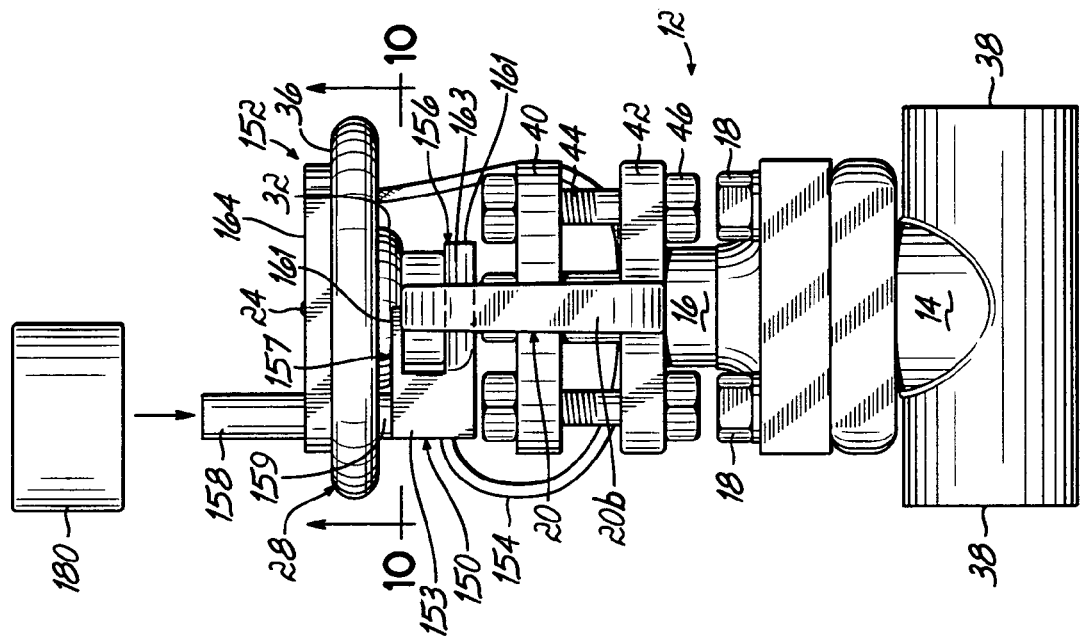
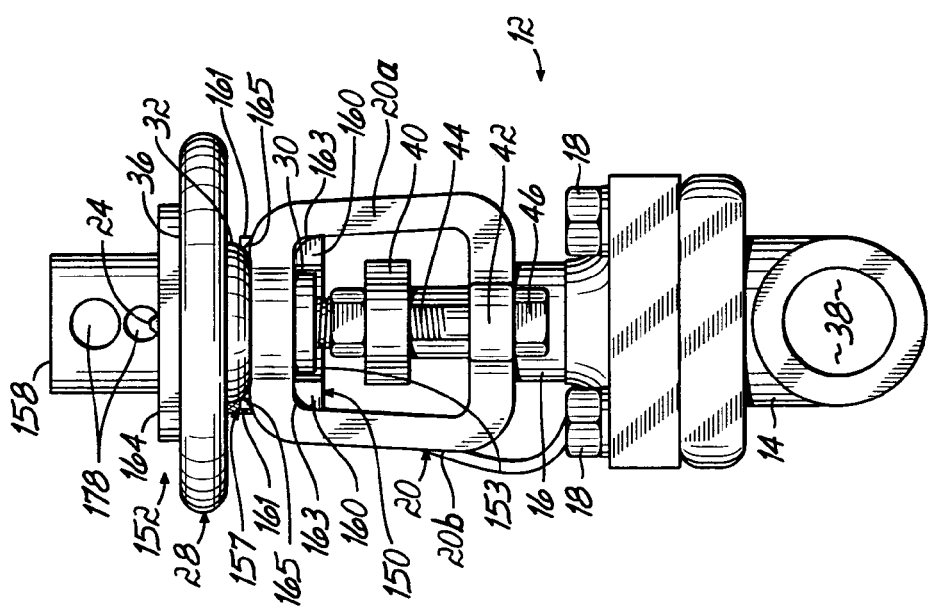
FIG. 9A
FIG. 9B

GATE VALVE LOCKING DEVICE

CROSS-REFERENCE TO RELATED APPLICATIONS

The application claims the benefit of U.S. Provisional Patent Application No. 60/581,804 filed on Jun. 22, 2004, and hereby incorporated by reference in its entirety.

FIELD OF THE INVENTION

This invention relates to locking systems in general, and specifically to a locking arrangement to secure gate valves against intentional and unintentional adjustment.

BACKGROUND OF THE INVENTION

A wide variety of types of valves are currently used in a vast array of applications. One common type of valve is known as a gate valve. Gate valves have long been, and are today, extensively used to control the flow of fluids frequently under high pressure. Uses for gate valves include controlling the flow through pipes of steam, oil, water, gas, and other fluids. Such valves are used at selected points on pipelines, in plants and to control the flow of water into buildings and other facilities. A gate valve being used in a preset position is preferably secured in that position and, for this purpose, the hand wheel of the gate valve is often secured to the truss support or other stationary portion of the valve by a chain and padlock.

Unfortunately, certain people, or even organizations, are tempted to tamper with the settings of gate valves and to do so, the chain is cut or the staple of a padlock is sawed. Quite frequently, tampering with a gate valve to the extent of changing its setting, even to the extremes of shutting it off completely or fully opening it, may produce disastrous consequences. For example, if the flow of water to a building is shut off, none of its automatic sprinklers may work with the result that there would be no automatic suppression of a fire in the building. In the situation of a pipeline conducting the flow of oil or water, shutting off a gate valve may result in shutting down pumps or even causing damage to the pumps, which do not have means to respond to a flow stoppage.

One prior art device aimed at solving at least some of these problems is disclosed in U.S. Pat. No. 5,353,833, issued Oct. 11, 1994, and hereby incorporated by reference in its entirety. The locking device disclosed in that patent includes a bracket that is clamped onto a portion of the truss extending upwardly from the valve bonnet and supporting a gate valve stem and a hand wheel. In one embodiment, the bracket clamps onto only one of the truss members and in another embodiment it engages both of the spaced truss members by spanning across the stem packing components. The bracket in each embodiment has a rigid bar extending upwardly which is capped by an L-shaped member seated against the inside of the hand wheel and between an adjacent pair of the radially extending spokes of the hand wheel. The bracket may be secured by a cylindrical lock having a recess into which the vertical portion of the L-shaped member is inserted and then locked. The bracket may also be secured by a padlock.

Unfortunately, the locking device disclosed in U.S. Pat. No. 5,353,833 has certain shortcomings. Specifically, if the bracket only engages one of the truss members it is not securely mounted to the valve. The bracket is prone to movement on the truss and the hand wheel can be rotated even when the locking device is installed. The embodiment of the locking device which mounts to both of the truss members may offer a more secure attachment, but installation and removal is often difficult and cumbersome. Moreover, the bracket often interferes with the stem packing to loosen and/or damage those components resulting in leakage from the valve.

Additionally, many valve hand wheels have 3, 5 or 6 spokes spaced equally at about 120°, 72° or 60°, respectively. Even if the device in the '833 patent is installed correctly and securely, the vertical portion of the L-shaped member projecting between the spokes does not entirely prevent rotation of and tampering with the hand wheel. For example, if such a locking device is installed on a gate valve with a 3 spoke hand wheel, the hand wheel could still be rotated up to 120° causing an unauthorized adjustment to the valve before the locking device prevents further rotation and adjustment.

Therefore, a need exists for a secure, effective and easily implemented device to prevent the unauthorized, inadvertent or otherwise undesired manipulation and adjustment of gate valves that does not suffer from these and other problems associated with prior art locking devices.

SUMMARY OF THE INVENTION

The locking device for gate valves according to this invention provides an economical and easily implemented solution for the secure locking of gate valves without damaging the gate valve and its components. Moreover, such a device according to this invention cannot be easily defeated, destroyed or otherwise removed without authorization. Therefore, the inadvertent, unauthorized or careless manipulation of gate valves from a desired position is prevented thereby minimizing, if not eliminating, the likelihood for damage or injury in an industrial or other setting as a result of the unauthorized opening/closing of the valve. These and other objectives of the invention have been attained by an improved locking device and associated method of use for gate valves according to this invention.

This invention utilizes an available lock and avoids the necessity of having to chain or weld the lock to the bonnet or other stationary portion of a standard gate valve. The type of gate valve to which this invention is particularly applicable is one in which the wheeled upper end of the valve stem and the stem are supported by a U-shaped truss, the base ends of which are welded or otherwise secured to the bonnet of the valve and the apex of which truss is orificed to pass the stem there through. The turning hand wheel is mounted onto the upper end of the stem. This invention utilizes a special bracket to secure the hand wheel against tampering or unauthorized turning.

In certain embodiments of this invention, the bracket is a barrel-shaped cylindrical sleeve, which mounts securely to one of the truss members of the gate valve. The bracket includes a number of bracket arms, which wrap around the truss. The bracket also includes an upwardly projecting mast, which is inserted between the adjacent spokes of the hand wheel.

The locking device according to embodiments in this invention also includes a cap, which is seated onto the hand wheel and the mast of the bracket installed on the gate valve. The cap includes a mast port though which the upper end of the mast projects when the cap is seated on the hand wheel. In certain embodiments, the cap covers all of the spokes on the hand wheel and has a number of downwardly projecting spaced spoke detents that are inserted into the openings between the adjacent spokes of the hand wheel. Spoke slots separate each of the spoke detents to receive the spokes therein. The cap is designed to accommodate a specific number of spokes on the hand wheel for secure retention of the hand wheel in the preset position. The upper end of the mast includes a lock hole through which the staple of a standard pad lock or other lock is inserted to lock the cap and bracket in place on the gate lock and thereby prevent unauthorized manipulation of the hand wheel and adjustment of the gate valve.

The advantage of this arrangement is not only the ease with which the bracket may be slipped onto one side of the U-shaped truss to project through the inside of the turning wheel, but the ability to use a standard, readily available lock. The secure and easy installation of the cap onto the mast of the bracket and the hand wheel prevents rotation of the hand wheel and adjustment of the valve.

The locking device according to this invention advantageously prevents the unauthorized manipulation of the hand wheel and the resulting adjustment of the valve to/from the open/closed positions. Moreover, the locking device of this invention is easily and efficiently installed and removed by an authorized user, is economically produced and its use efficiently implemented thereby increasing the security and safety of installations utilizing gate valves.

BRIEF DESCRIPTION OF THE DRAWINGS

The objectives and features of the invention will become more readily apparent from the following detailed description taken in conjunction with the accompanying drawings in which:

FIG. 1 is a perspective view of the components of a locking device according to one embodiment of this invention;

FIGS. 2A-2B are front and side elevational views respectively, of a bracket of the locking device being installed onto a gate valve;

FIG. 5 is a cross-sectional view taken along line 5-5 of FIG. 4A;

FIG. 6 is a perspective view of a second alternate embodiment of the bracket according to the locking device of this invention;

FIGS. 8A-8B are front and side elevational views respectively, of a bracket of the locking device of FIG. 7 installed onto a gate valve and a cap member being installed;

FIGS. 9A-9B are front and side elevational views respectively, of the locking device installed on the gate valve of FIGS. 8A-8B and being secured with a lock to inhibit adjustment of the valve.

DETAILED DESCRIPTION OF CERTAIN PREFERRED EMBODIMENTS

Figure 3A:
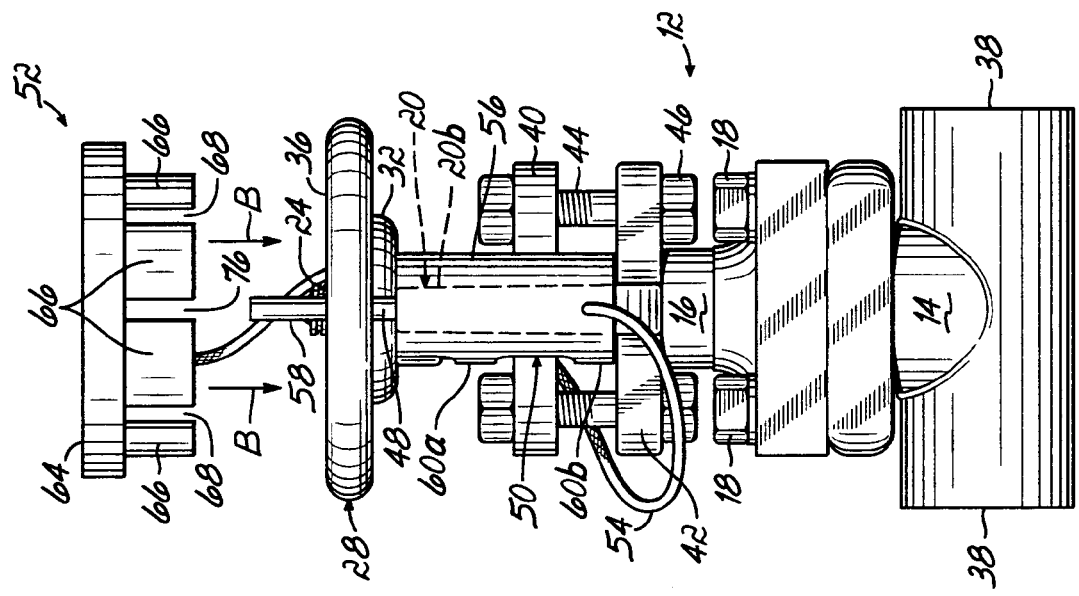
FIGS. 3A-3B are front and side elevational views respectively, of a cap member of the locking device being installed onto the bracket and gate valve of FIGS. 2A-2B.
Figure 3B:
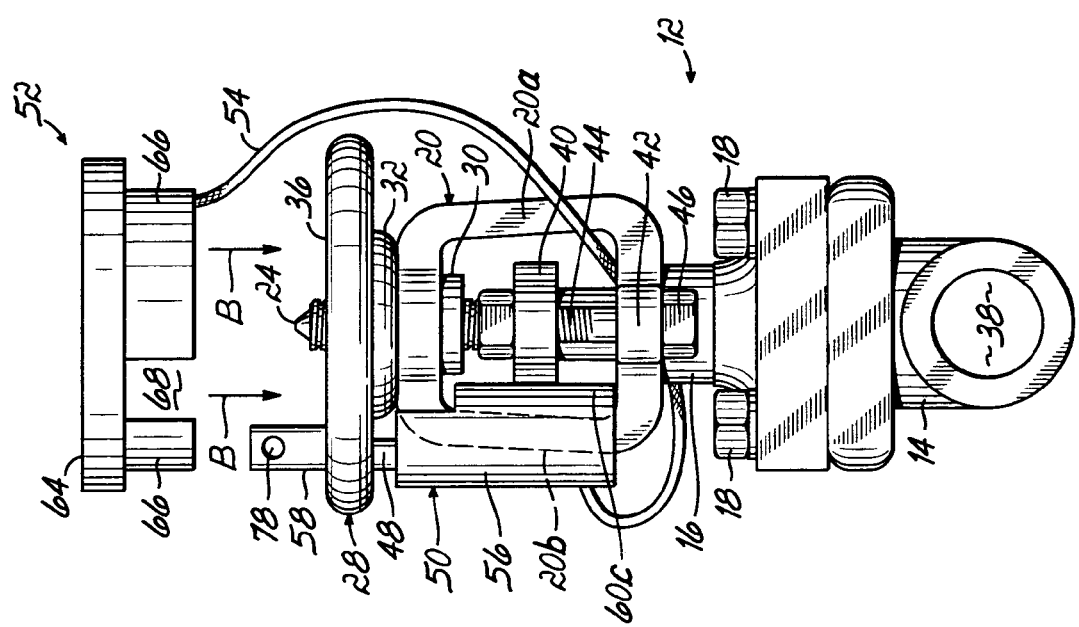

Referring now to the FIGS. 1-5 in which a first embodiment of a locking device 10 for a gate valve 12 is shown. FIGS. 2A-4B depict a standard gate valve 12, which includes a valve body 14 with a valve bonnet 16 secured thereto by bolts 18. Extending upwardly from the bonnet 16 is a U-shaped supporting truss 20 with associated truss members 20a, 20b. An orifice (not shown) is at the top of the truss 20 through which a valve stem 24 projects to receive the orificed center 26 of a hand wheel 28. The valve stem 24 is threaded and the wheel 28 is engaged on the stem 24 by a threaded nut 30 at a hub 32 of the hand wheel 28. The hand wheel 28 may include any number of generally equally spaced spokes 34, three of which are shown extending radially outward from the hub 32 to a peripheral ring 36.

Generally, the gate valve 12 includes a number of ports 38 for the entry and exit of fluid through the valve 12. The valve 12 of FIGS. 2A-4B is a two-way valve having a single entry and single exit port, although the locking device 10 of this invention can be used with any gate valve 12. The valve 12 includes a valve member (not shown) contained within the valve 12 to adjustably block or permit fluid flow into and out of the ports 38 and through the valve 12. The valve member is coupled to the stem 24 projecting upwardly from the bonnet 16. The valve 12 according to the embodiment shown includes a flange 40 spaced from a lower base 42 of the truss 20 and mounted thereto by a pair of bolts 44 and associated nuts 46. The stem 24 projects through the flange 40 to the hub of the hand wheel. Generally, the bonnet 16, bolts 18, truss 20, flange 40, truss base 42 and bolts/nuts 44, 46 combine to form the stem packaging components.

Rotation of the hand wheel 28 opens/closes the valve 12 by moving the valve member in the valve. The gate valve 12 may be a rising stem valve or a rising wheel valve in which rotation of the hand wheel 28 raises the stem 24 relative to the wheel 28 or raises the wheel 28 relative to the stem 24, respectively.

The locking device 10 according to various embodiments of this invention includes a bracket 50 and a cap 52 which may be joined together via a tether 54 so that these components will not be lost, misplaced or removed from the gate valve 12 on which they are selectively installed. The bracket 50 according to one embodiment of this invention as shown in FIG. 1 includes a cylindrical-shaped sleeve 56 and a mast 58 projecting upwardly therefrom. The sleeve 56 is preferably cylindrically formed and includes a number of bracket arms 60, three of which are shown in the embodiment of FIG. 1. A pair of spaced bracket arms 60a, 60b are positioned opposite a unitary bracket arm 60c and the shape, configuration and size of the bracket arms 60 are adapted to partially surround one of the truss arms 20a, 20b of the valve 12 for secure mounting of the bracket 50 to the valve 12. In an alternative embodiment of the bracket 50 according to this invention, the sleeve 56a may be generally rectangular or square-shaped configuration as shown in FIG. 6. The alternative embodiment of the bracket 50a shown in FIG. 6 is for use with the cap 52 of FIG. 1. The bracket 50a of FIG. 6 has a generally rectangular or square cross-sectional configuration for the sleeve 56a and the arms 60a, 60b, 60c are each generally linear with feet 84a, 84b, 84c projecting generally perpendicularly from the respective arm. In either embodiment, the bracket arms 60 are designed to be mounted on to the truss arms 20a, 20b as shown in FIG. 2A.

Specifically, the spaced or bifurcated bracket arms 60a, 60b are positioned adjacent the flange 40 of the valve 12 and the mast 58 is inserted through the hand wheel 28 between adjacent spokes 34. The mast 58 includes a narrowed neck portion 48 to provide for clearance relative to the spokes 34 and hub 32 of the hand wheel 28 when the bracket 50 is being installed on the valve 12. A mouth 62 of the bracket 50 between the opposing arms 60a, 60b and arm 60c is pushed over one of the truss arms 20a, 20b until the sleeve 56 surrounds the truss arm 20a, 20b as shown in FIG. 2A. With the bracket 50 in this position, it is pivoted as shown by arrow A in FIGS. 2A and 2B until the mast is radially oriented relative to the hand wheel 28 and the mouth 62 of the bracket 50 is juxtaposed towards the flange 40 and inwardly so that it is not exposed on the outer regions of the truss 20 (see FIGS. 3A and 3B).

The cap 52 of the locking device 10 according to the presently preferred embodiments of this invention includes an upper generally disk-shaped circular plate 64 with a number of downwardly depending arcuate-shaped spoke detents 66. Each of the spoke detents 66 is spaced from an adjacent spoke detent 66 by a spoke slot 68. The plate 64 also has a central, generally circular stem port 70 and an oval-shaped mast port 72 that extends through one of the spoke detents 66 and the upper plate 64. The stem port 70 accommodates a rising stem valve in which the stem 24 projects upwardly through the hub 32 of the hand wheel 28 and through the stem port 70 of the cap 52 depending upon the position and configuration of the valve when the locking device 10 is installed. The shape and configuration of the mast port 72 corresponds to that of the mast 58 so that the mast 58 may be easily inserted through the mast port 72 as shown in FIGS. 3A-4B.

Figure 4A:
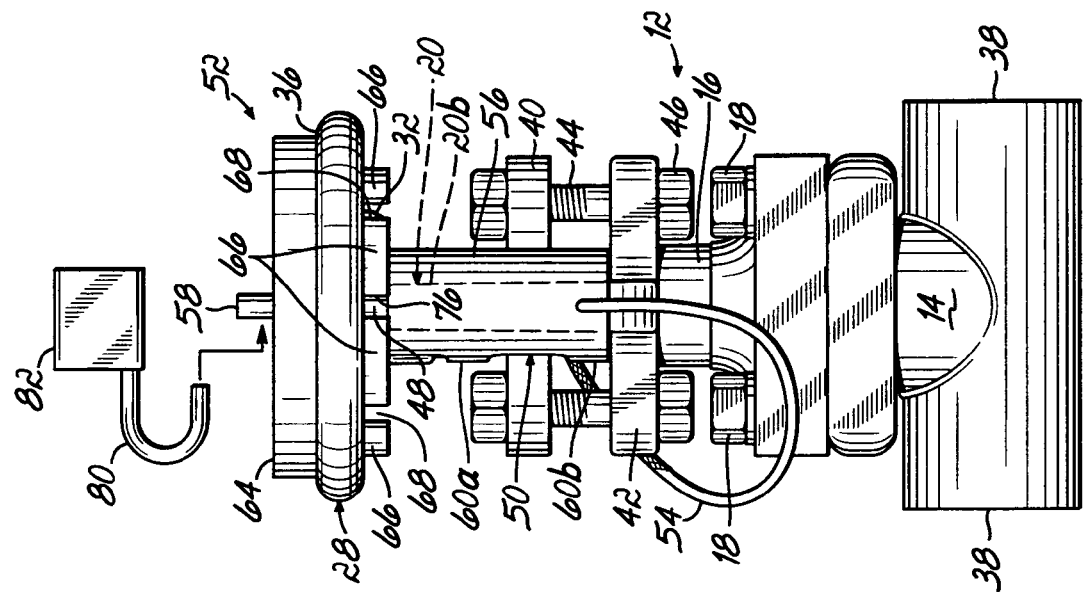
FIGS. 4A-4B are front and side elevational views respectively, of the locking device installed on the gate valve of FIGS. 3A-3B and being secured with a lock to inhibit adjustment of the valve.
Figure 4B:
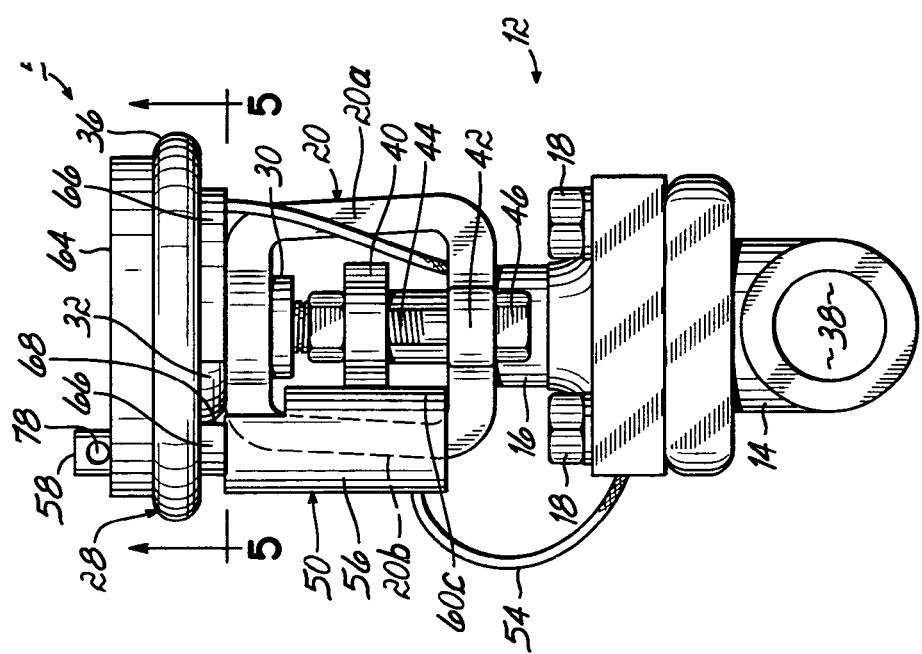

After the bracket 50 is installed onto the truss arm 20a, 20b of the gate valve 12 as previously described, the cap 52 is positioned atop the hand wheel 28 with the stem 24 aligned with the stem port 70 and the mast 58 aligned with the mast port 72. The cap 52 is then installed downwardly onto the hand wheel 28 in the direction of arrows B so that the spoke slots 68 are aligned with the spokes 34 and the spoke detents 66 are inserted into the openings 74 between the adjacent spokes 34. The stem 24 and mast 58 project upwardly through the respective ports 70, 72 until the cap 52 is fully seated on the hand wheel 28 and the mast 58 of the bracket 50 as shown in FIGS. 4A-4B. The alignment of the spoke detents 66 and spoke slots 68 relative to the spokes 34 and hub 32 of the hand wheel 28 is shown in FIG. 5. One of the spoke detents 66 includes a mast slot 76 aligned and in communication with the mast port 72 to allow the mast 58 to project upwardly through the cap 52 as shown in FIG. 5.

Once the cap 52 is seated on the hand wheel 28 with the mast 58 projecting through the mast port 72, a lock hole 78 proximate the top of the mast 58 is exposed on top of the cap 52 and readily accessible for a staple 80 or other locking portion of a lock 82 such as a pad lock, cylindrical lock or any variety of commercially available lock for use with the locking device 10 of this invention. With the lock 82 securely installed through the lock hole 78 in the mast 58 atop the cap 52, the gate valve 12 is secured against an unauthorized manipulation. Moreover, because of the position of the spoke detents 66 in the openings 74 between relative the spokes 34 in the hand wheel 28, rotation of the hand wheel 28 is entirely prevented unlike prior art devices as disclosed in U.S. Pat. No. 5,353,833 which permit a degree of rotation depending upon the spacing between the adjacent spokes. It is readily appreciated by one of ordinary skill in the art that the shape and configuration of the cap 52 and the associated spoke slots 68, spoke detents 66 and mast slot 76 can be adjusted to accommodate hand wheels of any design shape and spoke configuration. Moreover, a cap 52 which is designed to accommodate a six spoke hand wheel 28 can readily be used with a corresponding-sized three spoke hand wheel 28 with three of the spoke slots 68 in the cap 52 being occupied by a spoke 34 and the intermediate spoke slots being vacant when the cap 52 is installed on the three spoke hand wheel 28.

Removal of the locking device 10 is easily accomplished by unlocking the lock 82 and removing the staple 80 or comparable component from the lock hole 78, lifting the cap 52 upwardly off of the hand wheel 28 and mast 58 and rotating the bracket 50 until the mouth 62 between the bracket arms 60a, 60b and arm 60c is positioned to slide the bracket 50 off the truss arm 20a, 20b. The mast 58 is then lowered from between spokes 34 in the hand wheel 28 and removed from the gate valve 12. Advantageously, the tether 54 coupled to the cap 52 and bracket 50 of the locking device 10 conveniently keeps the locking device components associated with the gate valve 12 when the components are not installed thereon.

Figure 7:
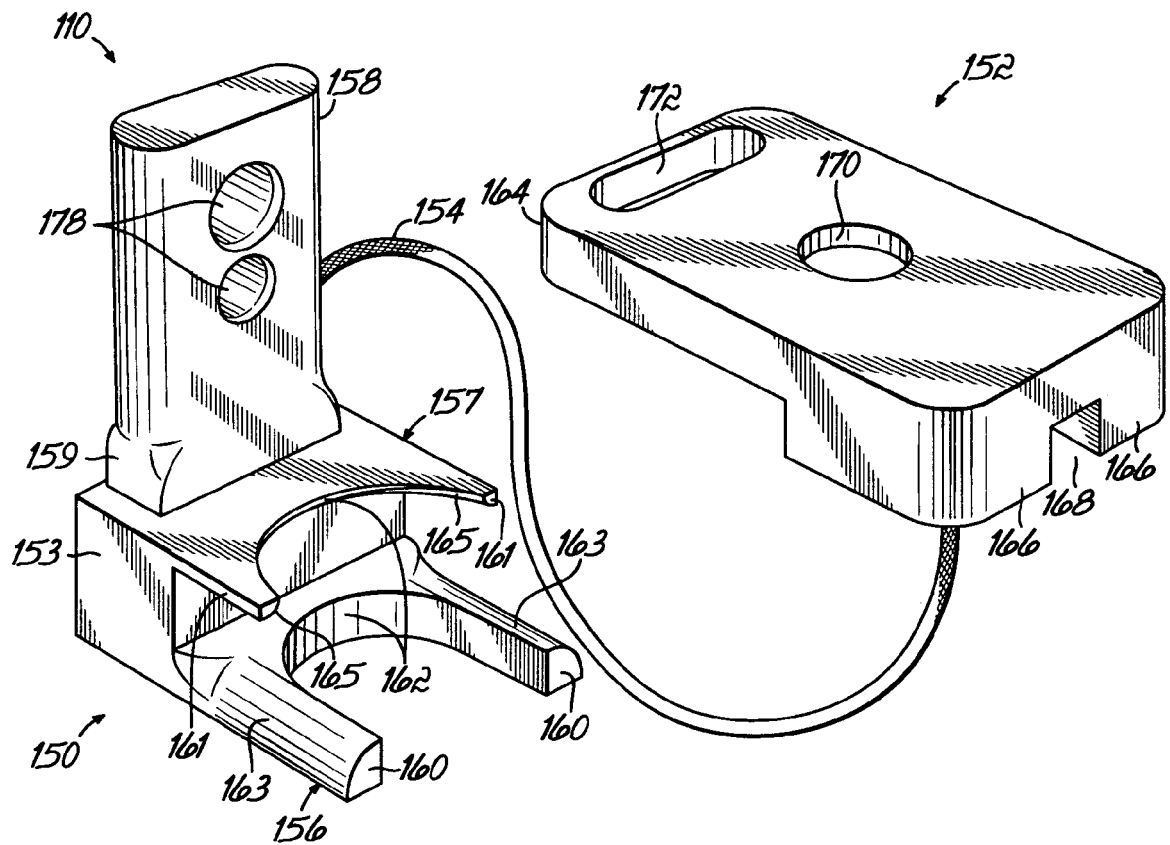
FIG. 7 is a perspective view of the components of a locking device according to a third alternative embodiment of this invention.

The locking device 110 according to an alternative embodiment is shown in FIGS. 7-10 and includes a bracket 150 and a cap 152 which may be joined together via a tether 154 so that these components will not be lost, misplaced or removed from the gate valve 12 on which they are selectively installed. The bracket 150 as shown in FIG. 7 includes a pair of spaced, generally U-shaped yokes 156, 157 and a mast 158 projecting upwardly therefrom. The yokes 156, 157 each project from a rectangular shaped block 153, which is wider than it is high as shown in FIG. 7. Each yoke 156, 157 includes a pair of spaced arms 160, 161 joined together by an arcuate shaped bight region 162 of the yoke 156, 157. The shape, configuration and size of the yoke arms 160, 161 are adapted to partially surround the stem packing components 22 of the valve 12 adjacent the upper end of the truss 20 for secure mounting of the bracket 150 to the valve 12. The arms 160 of the lower U-shaped yoke 156 are inserted around the stem packing components 22 and interior to the truss arms 20a, 20b as shown in FIGS. 8A-9B. The arms 160 have an outwardly beveled surface 163 to snugly fit within the upper end of the U-shaped truss 20. The bracket 150 is inserted generally perpendicular to the plane of the U-shaped truss 20. The arms 161 of the upper yoke 157 are inserted on opposite sides of the stem 24 between the upper end of the truss 20 and below the hub 32 of the wheel 28. The arms 161 have an inwardly lowered beveled surface 165 to fit snugly in position between the hub 32 and truss 20. The mast 158 includes a base 159 and is inserted through the hand wheel 28 between adjacent spokes 34.

The cap 152 of the locking device 110 according to this embodiment includes an upper generally rectangular-shaped plate 164 with a pair of downwardly depending contoured spoke detents 166. The spoke detents 166 are spaced from each other by a spoke slot 168. The plate 164 also has a central, generally circular stem port 170 and an oval-shaped mast port 172 that is opposite from the spoke detents 166. The stem port 170 accommodates a rising stem valve in which the stem 24 projects upwardly through the hub 32 of the hand wheel 28 and through the stem port 170 of the cap 152 depending upon the position and configuration of the valve when the locking device 110 is installed. The shape and configuration of the mast port 172 corresponds to that of the mast 158 so that the mast 158 may be easily inserted through the mast port 172 as shown in FIGS. 8A-9B.

Figure 10:
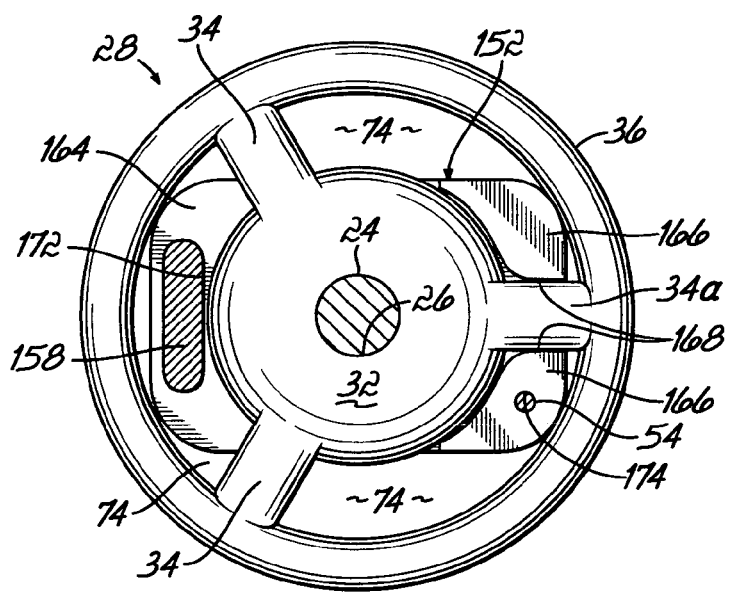
FIG. 10 is a cross-sectional view taken along line 10-10 of FIG. 9B.

After the bracket 150 is installed onto the truss 20 of the gate valve 12 as previously described, the cap 152 is positioned atop the hand wheel 28 with the stem 24 aligned with the stem port 170 and the mast 158 aligned with the mast port 172. The cap 152 is then installed downwardly onto the hand wheel 28 so that the spoke slot 168 is aligned with the spoke 34a opposite from the mast 158 and the spoke detents 166 are inserted into the openings 74 adjacent to spoke 34a. The stem 24 and mast 158 project upwardly through the respective ports 170, 172 until the cap 152 is fully seated on the hand wheel 28 and the mast 158 of the bracket 150 as shown in FIGS. 9A-9B. The alignment of the spoke detents 166 and spoke slot 168 relative to the spokes 34, 34a and hub 32 of the hand wheel 28 is shown in FIG. 10. One of the spoke detents 166 includes a tether hole 174 to which the tether 154 is joined to the cap 152.

Once the cap 152 is seated on the hand wheel 28 with the mast 158 projecting through the mast port 172, one or more lock holes 178 proximate the top of the mast 158 are exposed on top of the cap 152 and readily accessible for a pin or other locking portion (not shown) of a cylindrical lock 180 or any variety of commercially available lock for use with the locking device 110 of this invention. With the lock 180 securely installed through the appropriate lock hole 178 in the mast 158 atop the cap 152, the gate valve 12 is secured against an unauthorized manipulation. Moreover, because of the position of the spoke detents 166 in the openings 74 between the spokes 34 in the hand wheel 28, rotation of the hand wheel 28 is entirely prevented unlike prior art devices as disclosed in U.S. Pat. No. 5,353,833 which permit a degree of rotation depending upon the spacing between the adjacent spokes. It is readily appreciated by one of ordinary skill in the art that the shape and configuration of the cap 152 and the associated spoke slots 168, and spoke detents 166 can be adjusted to accommodate hand wheels 28 of any design shape and spoke configuration.

Removal of the locking device 110 is easily accomplished by unlocking the lock 180 and removing the pin or component comparable from the lock hole 178, lifting the cap 152 upwardly off of the hand wheel 28 and mast 158 and withdrawing the bracket 150 from the truss 20. The mast 158 is likewise lowered from between spokes 34 in the hand wheel 28 and removed from the gate valve 12. Advantageously, the tether 154 coupled to the cap 152 and bracket 150 of the locking device 110 conveniently keeps the locking device components associated with the gate valve 12 when the components are not installed thereon.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

What is claimed is:

1. A locking assembly for a gate valve having a hand wheel with a plurality of spaced spokes emanating from a central hub, a spacing between adjacent spokes and rotatable relative to a valve stem projecting through a truss having at least two spaced truss arms extending upwardly from a body of the gate valve, the locking assembly comprising:
a bracket adapted to be mounted to one of the at least two truss arms;
a mast extending upwardly from the bracket and adapted to project through the hand wheel between a pair of adjacent spokes when the bracket is mounted to one of the at least two truss arms; and
a cap having at least two spaced spoke detents projecting downwardly therefrom;
wherein the cap is adapted to be mounted atop the hand wheel coupling with the mast and the spoke detents each being inserted into respective spacings between the spokes of the hand wheel when the bracket is mounted to one of the at least two truss arms to thereby inhibit rotation of the hand wheel relative to the stem.

2. The locking assembly of claim 1 further comprising:
a mast port in the cap through which the mast projects when the cap is mounted atop the hand wheel.

3. The locking assembly of claim 1 further comprising:
a lock adapted to selectively engage the mast of the bracket to thereby prevent removal of the cap and bracket from the gate valve.

4. The locking assembly of claim 2 further comprising:
a hole positioned at the end of the mast opposite the bracket, wherein the hole is accessible above the cap while the mast is projecting through the mast port; and
a lock adapted to be secured to the mast via the hole.

5. The locking assembly of claim 1 wherein each of the spoke detents is inserted between a different pair of adjacent spokes of the hand wheel.

6. The locking assembly of claim 1 wherein the bracket further comprises:
a plurality of spaced bracket arms adapted to surround the truss arm when mounted thereon.

7. The locking assembly of claim 1 wherein the mast projects through one of the spoke detents in the cap.

8. The locking assembly of claim 1 wherein a cross-sectional configuration of the bracket is one of circular and rectangular.

9. The locking assembly of claim 1 wherein each of the spacings between adjacent spokes of the hand wheel have a spoke detent inserted therein when the cap is installed on the hand wheel.

10. The locking assembly of claim 1 wherein the bracket is adapted to engage only one of the truss arms when mounted to the gate valve.

11. The locking assembly of claim 1 further comprising:
a stem port in the cap adapted to receive the valve stem there through when the cap is installed on the hand wheel.

12. The locking assembly of claim 1 wherein the spoke detents are arcuately shaped.

13. The locking assembly of claim 1 wherein the bracket does not engage the valve stem when mounted to the valve.

14. The locking assembly of claim 1 further comprising:
a tether connecting the cap to the bracket.

15. A locking assembly for a gate valve having a hand wheel with a plurality of spaced spokes emanating from a central hub, a spacing between adjacent spokes and rotatable relative to a valve stem projecting through packing components and through a truss having a pair of truss arms extending upwardly from a body of the gate valve wherein the truss arms are relatively in the same plane, the locking assembly comprising:
a bracket adapted to engage the gate valve generally perpendicular to the plane of the truss arms;
a mast extending upwardly from the bracket and adapted to project though the hand wheel between a pair of adjacent spokes when the bracket is engaging the gate valve; and
a cap having a pair of spoke detents projecting downwardly therefrom;
wherein the cap is adapted to be mounted atop the hand wheel coupling with the mast with the spoke detents each being inserted into adjacent spacings between the spokes of the hand wheel when the bracket is engaging the gate valve to thereby inhibit rotation of the hand wheel relative to the stem.

16. The locking assembly of claim 15 further comprising:
a pair of spaced yokes each having a pair of yoke arms projecting generally perpendicular from the bracket with respect to the mast;
wherein the shape, configuration and size of the yoke arms are adapted to partially surround the valve stem of the valve adjacent to the upper end of the truss.

17. The locking assembly of claim 15 further comprising:
a mast port in the cap through which the mast projects when the cap is mounted atop the hand wheel.

18. The locking assembly of claim 15 further comprising:
a lock adapted to selectively engage the mast of the bracket to thereby prevent removal of the cap and the bracket from the gate valve.

19. The locking assembly of claim 17 further comprising:
a hole positioned at the end of the mast opposite the bracket, wherein the hole is accessible above the cap while the mast is projecting through the mast port; and
a lock adapted to be secured to the mast via the hole.

20. The locking assembly of claim 15 wherein the pair of spoke detents are inserted on opposite sides of a spoke on the hand wheel positioned opposite and generally perpendicular to the mast.

21. The locking assembly of claim 15 further comprising:
a stem port in the cap adapted to receive the valve stem there through when the cap is installed on the hand wheel.

22. The locking assembly of claim 15 further comprising:
a tether connecting the cap to the bracket.

23. A combination comprising:
a gate valve having a hand wheel with a plurality of spaced spokes emanating from a central hub, a spacing between adjacent spokes and rotatable relative to a valve stem projecting through a truss having at least two spaced truss arms extending upwardly from a body of the gate valve;
a bracket adapted to be mounted to one of the at least two truss arms;
a mast extending upwardly from the bracket and adapted to project through the hand wheel between a pair of adjacent spokes when the bracket is mounted to one of the at least two truss arms; and
a cap having at least two spaced spoke detents projecting downwardly therefrom;
wherein the cap is adapted to be mounted atop the hand wheel coupling with the mast and the spoke detents each being inserted into respective spacings between the spokes of the hand wheel when the bracket is mounted to one of the at least two truss arms to thereby inhibit rotation of the hand wheel relative to the stem.

24. The combination of claim 23 further comprising:
a mast port in the cap through which the mast projects when the cap is mounted atop the hand wheel.

25. The combination of claim 23 further comprising:
a lock adapted to selectively engage the mast of the bracket to thereby prevent removal of the cap and bracket from the gate valve.

26. The combination of claim 23 wherein each of the spoke detents is inserted between a different pair of adjacent spokes of the hand wheel.

27. The combination of claim 23 wherein the mast projects through one of the spoke detents in the cap.

28. The combination of claim 23 wherein each of the spacings between adjacent spokes of the hand wheel have a spoke detent inserted therein when the cap is installed on the hand wheel.

29. The combination of claim 23 further comprising:
a stem port in the cap adapted to receive the valve stem there through when the cap is installed on the hand wheel.

30. The combination of claim 23 further comprising:
a tether connecting the cap to the bracket.

31. A combination comprising:
a gate valve having a hand wheel with a plurality of spaced spokes emanating from a central hub, a spacing between adjacent spokes and rotatable relative to a valve stem projecting through packing components and through a truss having a pair of truss arms extending upwardly from a body of the gate valve wherein the truss arms are relatively in the same plane;
a bracket adapted to engage the gate valve generally perpendicular to the plane of the truss arms;
a mast extending upwardly from the bracket and adapted to project though the hand wheel between a pair of adjacent spokes when the bracket is engaging the gate valve; and
a cap having a pair of spoke detents projecting downwardly therefrom;
wherein the cap is adapted to be mounted atop the hand wheel coupling with the mast with the spoke detents each being inserted into adjacent spacings between the spokes of the hand wheel when the bracket is engaging the gate valve to thereby inhibit rotation of the hand wheel relative to the stem.

32. The combination of claim 31 further comprising:
a pair of spaced yokes each having a pair of yoke arms projecting generally perpendicular from the bracket with respect to the mast;
wherein the shape, configuration and size of the yoke arms are adapted to partially surround the valve stem of the valve adjacent to the upper end of the truss.

33. The combination of claim 31 further comprising:
a mast port in the cap through which the mast projects when the cap is mounted atop the hand wheel.

34. The combination of claim 31 further comprising:
a lock adapted to selectively engage the mast of the bracket to thereby prevent removal of the cap and the bracket from the gate valve.

35. The combination of claim 31 wherein the pair of spoke detents are inserted on opposite sides of a spoke on the hand wheel positioned opposite and generally perpendicular to the mast.

36. The combination of claim 31 further comprising:
a stem port in the cap adapted to receive the valve stem there through when the cap is installed on the hand wheel.

37. The combination of claim 31 further comprising:
a tether connecting the cap to the bracket.

* * * * *